Feb. 9, 1965 W. F. NUSS, JR 3,168,835
TRANSMISSION BELT TENSION ADJUSTING MEANS
Filed March 4, 1963 2 Sheets-Sheet 1

WILLIAM FRANK NUSS, JR.
INVENTOR.

BY
ATTORNEY

WILLIAM FRANK NUSS, JR.
INVENTOR.

United States Patent Office 3,168,835
Patented Feb. 9, 1965

3,168,835
TRANSMISSION BELT TENSION
ADJUSTING MEANS
William Frank Nuss, Jr., P.O. Box 12132,
Fort Worth, Tex.
Filed Mar. 4, 1963, Ser. No. 262,697
2 Claims. (Cl. 74—242.13)

This invention relates to a bolt retainer, and it concerns more particularly, in combination with apparatus comprising a motor, drive means including a belt driven by the motor, means driven by said drive means, and means adjustably securing the motor, or alternatively, said means driven by said drive means, to a support therefor including two or more bolts which are passed thru holes therefor in said support and thru slots in the base of the motor, or of said means driven by said drive means, as the case may be, whereby the tension applied to the belt may be adjusted by loosening nuts applied to the bolts and adjusting the position of the motor, or of said means driven by said drive means, relative to its support, the combination of rigid means removably connected to said bolts and embracing the heads thereof to prevent the bolts from turning while acting on the corresponding nuts with a wrench to loosen them preparatory to adjusting the position of the motor, or of said means driven by said drive means, and thereafter tightening the nuts.

The invention is particularly applicable to small compact units having a motor, either electrically or gasoline driven, which is connected by a belt to a pump, compressor, tool, or other device which is driven thereby.

It is common practice to mount a motor on a supporting bracket and to adjustably secure the motor to the bracket by means including two pairs of bolts which are passed thru holes therefor in the bracket and thru slots in the base of the motor whereby the tension applied to a belt driven by the motor may be adjusted by loosening nuts applied to the bolts and adjusting the position of the motor relative to its support. This ordinarily involves the use of two separate wrenches applied to the bolts and the nuts, respectively, any or all of which may be difficultly accessible.

This invention contemplates, in combination with apparatus as described, rigid means removably connected to the bolts of one pair and embracing the heads thereof to prevent the bolts from turning while acting on the corresponding nuts with a wrench to loosen them preparatory to adjusting the position of the motor and thereafter tightening the nuts.

The invention is applicable to any use where two or more bolts need to be held against rotation while loosening and/or tightening a nut on the bolt for an operation requiring a shift in position of the bolts or the piece held by the bolts, as long as the bolts retain the same position relative to each other.

In a modified form of the invention a single bolt retainer for use with two pairs of bolts may have the bolts of the two pairs removably connected thereto, the heads of the respective bolts being received in the corresponding sockets therefor.

In another form of the invention the pump, compressor, tool, or other device which is connected by the belt to the motor and is driven thereby, rather than the motor, may be adjustably positioned relative to its support whereby the tension applied to the belt may be adjusted by adjusting the position of said pump, compressor, tool, or other device relative to its support.

An object of the invention is to provide a bolt retainer as described which is characterized by its simplicity and may be produced inexpensively, and which comprises a separate piece, readily applicable to existing apparatus without substantial alteration thereof.

The invention will be readily understood by referring to the following description and the accompanying drawing, in which.

Figure 3:
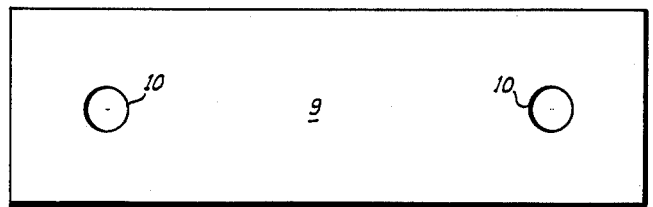
Figure 4:
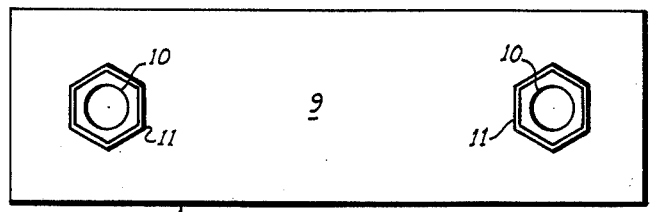
Figure 5:
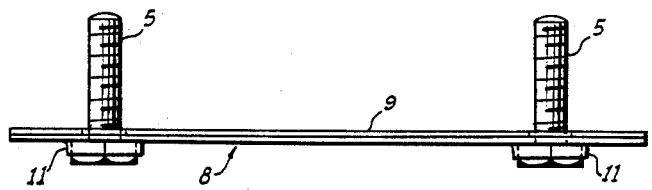

FIGS. 3 to 5, inclusive, are detail views of the bolt retainer.

Figure 1:
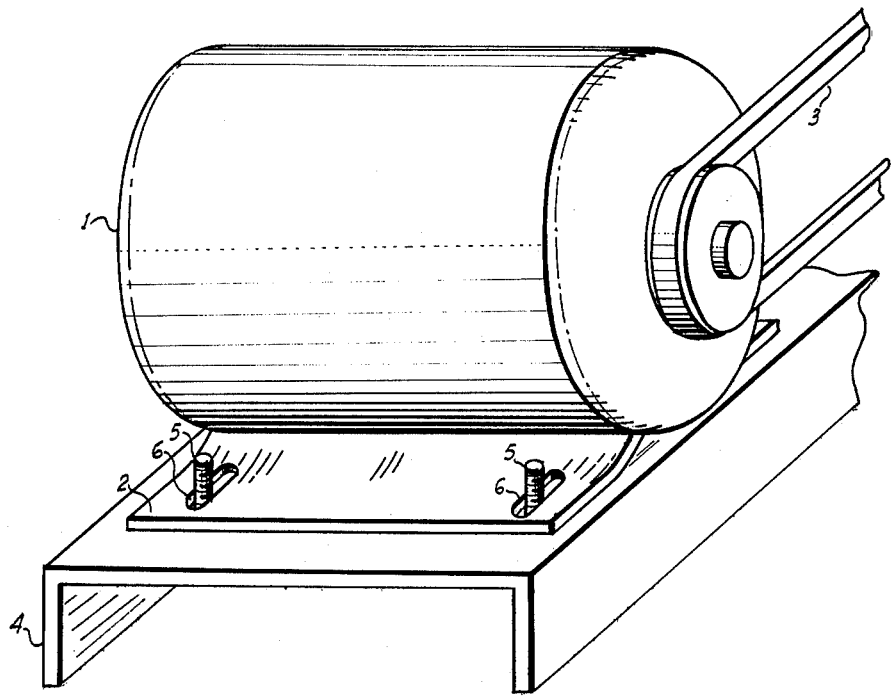
FIG. 1 is a perspective view showing the top and two adjacent sides of apparatus as described having the bolt retainer of the invention, which does not appear in FIG. 1, applied to the under side thereof.
Figure 2:
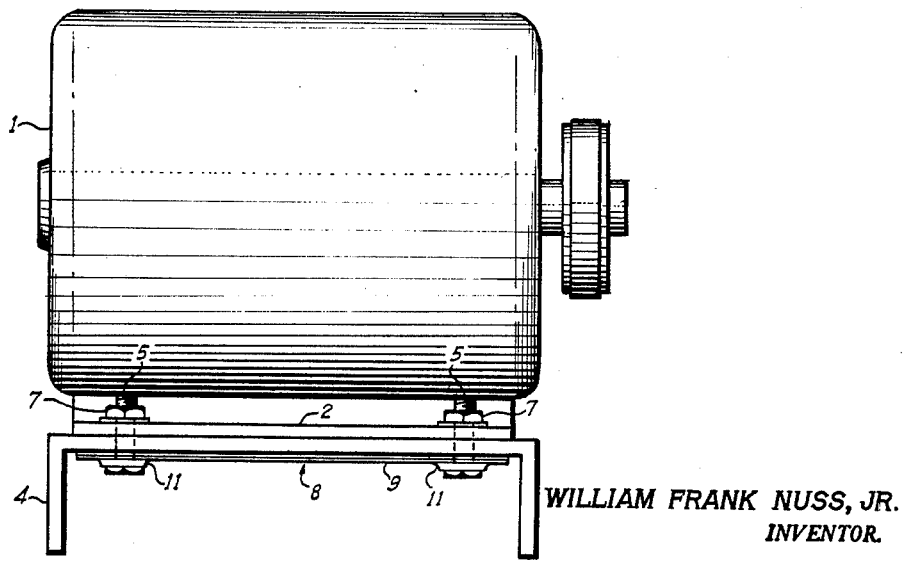
FIG. 2 is an elevational view thereof showing the bolt retainer.

Referring to FIGS. 1 and 2 of the drawing, the numeral 1 designates generally an electric motor having a base 2. A belt 3 is driven by the motor 1, which is adjustably secured to a supporting bracket, indicated generally by the numeral 4, by two pairs of bolts 5 which are passed thru holes therefor in the bracket 4 and thru slots 6 in the base 2 of the motor 1 whereby the tension applied to the belt 3 may be adjusted by loosening nuts 7 applied to the bolts 5 and adjusting the position of the motor 1 relative to the bracket 4.

The bolt retainer of the invention, indicated generally by the numeral 8, consists essentially of a small planar member 9 positioned on the side of the bracket 4 opposite the motor 1, as illustrated in FIG. 2, having a pair of holes 10 in its opposite end portions and having polygonal sockets 11 on one side thereof surrounding the holes 10, as shown in FIGS. 3 to 5. The bolts 5 of one pair are passed thru the respective holes 10 and have their heads received in the corresponding sockets 11.

The sockets 11 prevent the bolts 5 from turning so that they may be readily loosened sufficiently to adjust the position of the motor 1 relative to the bracket 4 and thereafter tightened again by use of a single wrench applied to the nuts 7 only.

The invention contemplates that both of the bolts 5 of each pair will remain in place at all times, and that the nuts 7 will not at any time be entirely removed.

The invention may be modified in various ways without departing from the spirit and scope thereof.

I claim:
1. In combination with apparatus comprising a motor having a base, drive means including a belt driven by the motor, a bracket providing a support for the motor, and means adjustably securing the motor to the bracket including two pairs of bolts which are passed thru holes therefor in the bracket and thru slots in the base of the motor whereby the tension applied to the belt may be adjusted by loosening nuts applied to the bolts and adjusting the position of the motor relative to its support, the combination of rigid means secured by said nuts to the bolts of one pair, whereby it is removably clamped thereto, in the tightened positions of said nuts, and embraces the heads thereof to prevent the bolts from turning when the corresponding nuts are turned with a wrench to loosen them preparatory to adjustment of the position of the motor and when the nuts are tightened thereafter.

2. The structure of claim 1, wherein said rigid means consists essentially of a small planar member positioned on the side of the bracket opposite the motor and has a pair of holes in its opposite end portions with polygonal sockets on one side thereof surrounding the holes, and the bolts of said one pair passing thru the respective holes and having their heads received in the corresponding sockets.

References Cited by the Examiner
UNITED STATES PATENTS
1,177,540   3/16   Sager _____ 151—44
2,469,441   5/49   Pitisci _____ 151—54
2,927,471   3/60   Long _____ 74—242.14

DON A. WAITE, *Primary Examiner.*